(12) United States Patent
Vogel et al.

(10) Patent No.: US 10,202,861 B2
(45) Date of Patent: Feb. 12, 2019

(54) SEALING ARRANGEMENT FOR SEALING A GAP BETWEEN TWO COMPONENTS WHICH BEAR FLAT AGAINST ONE ANOTHER ON THE GAP SIDE AT ROOM TEMPERATURE

(71) Applicant: Siemens Aktiengesellschaft, Munich (DE)

(72) Inventors: Berthold Vogel, Brackenheim (DE); Karl Klein, Essen (DE); Stephan Sonnen, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 330 days.

(21) Appl. No.: 15/120,018

(22) PCT Filed: Jan. 19, 2015

(86) PCT No.: PCT/EP2015/050849
§ 371 (c)(1),
(2) Date: Aug. 18, 2016

(87) PCT Pub. No.: WO2015/132013
PCT Pub. Date: Sep. 11, 2015

(65) Prior Publication Data
US 2017/0067355 A1   Mar. 9, 2017

(30) Foreign Application Priority Data
Mar. 7, 2014   (EP) .................................. 14158234

(51) Int. Cl.
*F01D 11/00*   (2006.01)
*F01D 25/24*   (2006.01)
(Continued)

(52) U.S. Cl.
CPC ............ *F01D 11/003* (2013.01); *F01D 11/00* (2013.01); *F01D 11/005* (2013.01); *F01D 25/24* (2013.01);
(Continued)

(58) Field of Classification Search
CPC ...... F01D 11/00; F01D 11/003; F01D 11/005; F01D 25/24; F16J 15/027; F16J 15/0887; F05D 2220/32
See application file for complete search history.

(56) References Cited

U.S. PATENT DOCUMENTS 4,454,711 A * 6/1984 Ben-Porat ................. F23R 3/10
60/748
5,975,844 A   11/1999 Milazar et al.
(Continued)

FOREIGN PATENT DOCUMENTS

CN   1539050 A   10/2004
CN   101960100 A   1/2011
(Continued)

OTHER PUBLICATIONS

CN Office Action dated Mar. 8, 2017, for CN patent application No. 201580012229.X.
(Continued)

*Primary Examiner* — Igor Kershteyn
(74) *Attorney, Agent, or Firm* — Beusse Wolter Sanks & Maire

(57) ABSTRACT

A sealing arrangement for sealing a gap between two components which bear flat against one another on the gap side and which can be assembled only by transverse movement, wherein each component has a step on the gap side to form an overlapping stop and the steps are curved along their edges. One of the two components has a first groove which extends in a manner analogous to the curved edge and which is arranged in the set-back partial surface of the gap side of the component in question. The other of the two components has a recess located opposite the groove, and a modular sealing element comprising a sealing strip and a spiral strip
(Continued)

is provided, which bears with its first sealing section, protruding from the groove, against a side face of the recess.

6 Claims, 3 Drawing Sheets

(51) Int. Cl.
 *F16J 15/02* (2006.01)
 *F16J 15/08* (2006.01)
(52) U.S. Cl.
 CPC ......... *F16J 15/027* (2013.01); *F16J 15/0887* (2013.01); *F05D 2220/32* (2013.01)

(56) References Cited

U.S. PATENT DOCUMENTS

| | | | |
|---|---|---|---|
| 9,212,564 B2* | 12/2015 | Langlois | .......... F01D 9/04 |
| 2003/0123979 A1* | 7/2003 | Mohammed-Fakir | ...................... F01D 11/005 415/189 |
| 2005/0076642 A1 | 4/2005 | Reichert | |
| 2006/0045746 A1 | 3/2006 | Synnott | |
| 2007/0154305 A1* | 7/2007 | Arness | ............ F01D 9/041 415/209.2 |
| 2008/0012241 A1 | 1/2008 | Norman et al. | |
| 2011/0085904 A1 | 4/2011 | Gossmann | |
| 2011/0272890 A1* | 11/2011 | Selby | ............ F01D 11/003 277/345 |
| 2011/0311353 A1 | 12/2011 | Arness et al. | |
| 2015/0102565 A1 | 4/2015 | Feldmann et al. | |
| 2015/0132054 A1* | 5/2015 | Dreischarf | ............. F01D 25/24 403/376 |

FOREIGN PATENT DOCUMENTS

| | | |
|---|---|---|
| DE | 102007001459 A1 | 7/2007 |
| DE | 1020070014591 A1 | 7/2007 |
| EP | 0852659 B1 | 4/2002 |
| EP | 1878880 A1 | 1/2008 |
| EP | 2385275 A1 | 11/2011 |
| EP | 2525047 A1 | 11/2012 |
| EP | 2853692 A1 | 4/2015 |
| GB | 2378486 A | 2/2003 |

OTHER PUBLICATIONS

EP Search Report, dated May 28, 2014, for EP application No. 14158234.6.
International Search Report, dated Jun. 19, 2015, in PCT application No. PCT/EP2015/050849.

* cited by examiner

SEALING ARRANGEMENT FOR SEALING A GAP BETWEEN TWO COMPONENTS WHICH BEAR FLAT AGAINST ONE ANOTHER ON THE GAP SIDE AT ROOM TEMPERATURE

CROSS REFERENCE TO RELATED APPLICATIONS

This application is the US National Stage of International Application No. PCT/EP2015/050849 filed Jan. 19, 2015, and claims the benefit thereof. The International Application claims the benefit of European Application No. EP14158234 filed Mar. 7, 2014. All of the applications are incorporated by reference herein in their entirety.

FIELD OF INVENTION

The invention relates to a sealing arrangement for sealing a gap between two components which at room temperature bear flat against each other on the gap side, wherein each component has, on the gap side, a step for forming an overlapping stop and the steps are curved along their edges.

BACKGROUND OF INVENTION

Such a sealing arrangement is known in particular in the case of housings of thermal turbomachines. Thermal turbomachines are usually designed as stationary gas turbines or as steam turbines with a relatively thick-walled housing in order to shield the high pressures which prevail inside from the environment. Owing to the solid design of the housing and its particular size, it is customary to design the housing in several parts and manufacture it using a casting process. The basically tubular housings are generally split in half at a so-called horizontal split joint so that the housings in question have a lower housing part and an upper housing part. At the same time, the housings have such an axial extent that they are also designed in several parts in this direction: the housings are then split at axial joints which are also referred to as vertical split joints. The regions at which both the horizontal split joint and the axial split joint meet each other are referred to as split cross-joints.

The individual housing parts are equipped with flanges which point outward at the respective housing edge and thus provide space for bores in order to permanently and reliably connect together the abutting flanges of directly adjacent housing parts by means of expansion screws.

It has, however, been shown to be the case that, owing to the high differences in temperature between room temperature and operating temperature, the housing parts are subject to the effects of thermal expansion, which can differ locally both in their behavior over time and in degree, in particular because of the arrangement of the flanges. These locally differing expansion effects can cause the housing parts to gape apart slightly at the split joints, despite them being pressed together with great force by the numerous expansion screws. This impairs the sealing of the split joints so that, in the worst-case scenario, small leaks to the outside may even occur.

At the same time, it is known, for example from EP 0 852 659 B1, to provide a ribbed seal in the flange surfaces of two abutting housing parts in order to reduce leaks from inside the housing to the outside when gaps occur.

Instead of the ribbed seals from EP 0 852 659 B1, so-called E-seals can also be used which are positioned in just one groove, seated on an opposite flange surface. It has, however, been shown that even seals of this type do not have a sufficient springback capacity to close the size of gaps that actually occur. In addition, such E-seals are very expensive, complicated to fit and also designed to be used only once so they need to be replaced after they have been used and a housing equipped with them has been opened. U-shaped seals are also known, for example from DE 102007001459 A1.

It should moreover be noted that, in thermal turbomachines of the type mentioned at the beginning, when placing the final upper housing part on a lower housing half, when said housing part is lowered it must be moved along a gap surface of the adjacent upper housing part with a precise fit as no lateral movement is possible during assembly. With respect to the vertical split joint, it is thus impossible to move the last housing part to be assembled axially, i.e. laterally, onto the other upper housing part. This assembly-related constraint means that it is not possible to use current sealing systems with the opposing grooves and seals seated therein, disclosed in EP 0 852 659 B1, at the relevant locations.

SUMMARY OF INVENTION

An object of the invention is therefore to provide a sealing arrangement for sealing two components which bear flat against each other on the gap side and enable a means of assembly in which one of the two components is moved along the potential leakage path.

The object of the invention is achieved with a sealing arrangement as claimed.

In a sealing arrangement according to the invention for sealing a gap between two components which at room temperature bear flat against each other on the gap side, wherein each component has, on the gap side, a step for forming an overlapping stop and the steps are curved along their edges, it is provided that one of the two components has a first groove extending in a similar fashion to the curved edge and which is arranged in the part surface of the gap side of the relevant component, said part surface being set back owing to the step, that the other of the two components has a recess opposite the groove and shortening this step, and that a sealing element is provided which, seated in the groove, bears with a first sealing portion against a side face of the recess.

The invention is based on the insight that, in the case of the two components of the sealing arrangement, the sealing surfaces should not be oriented so that they are parallel to the gap surfaces of the components, which when they bear flat against each other define the actual gap to be sealed, but transversely, in particular at right angles.

In particular, this feature makes it possible, despite the presence of a sealing element, for the gap surfaces of the two components not to be moved onto each other whilst they are assembled, which is defined according to this application as a lateral movement of the two components relative to each other. Instead, the relative assembly movement of the two components is parallel to their gap surfaces which later bear against each other, which is defined according to this application as a transverse movement of the two components. In particular in combination with the curved steps arranged on the gap side, the respective contact surfaces of which bear against each other as stop surfaces in the final operating position, it is thus possible that the sealing element only comes to bear, with a first sealing portion, against a side face of the recess of the other component in sealing fashion when the two components have almost reached their final position relative to each other. This prevents frictional wear on the sealing element when the components are assembled. Because the bearing surface for the first sealing portion does not, as before, coincide with the gap surface of the other component but with the side wall of the recess and the side wall of the recess is oriented transversely to the gap surface, the depth by which the sealing element extends into the other component can in principle be chosen to be as great as desired. However, this extent is advantageously chosen to be only a little greater than the maximum expected size of the gap between the two gap surfaces so that a better sealing effect than beforehand can be obtained with a simultaneously greater deformability of the components.

The groove is moreover arranged close to the step and the sealing element comprises a sealing strip and a spiral strip pressing the sealing strip against a side wall of the groove, wherein a portion of the sealing strip which projects from the groove lies with pretension against said side wall of the recess as a first sealing portion. In addition, the contact surface of the step of one component faces the space at higher pressure. It is hereby achieved that any leak which may occur from a space at higher pressure toward a space at lower pressure cannot, on the one hand, bypass the first seal by means of its first sealing portion and the side wall of the recess. On the other hand, that portion of the sealing strip which is arranged in the groove lies pressed tightly in a corner of the groove bottom and groove side wall of the spiral strip. A possible leak at high pressure may increase the contact pressure of the sealing strip against the respective bearing surface—on the one hand, the side wall of the groove and, on the other hand, the contact surface of the step—which increases the sealing effect. In the case of both smaller component curvatures or radii and larger component curvatures or radii, this design of the sealing element is simpler to assemble because, on the one hand, it has a modular design and, on the other hand, it has a more simplified geometry. This simplified geometry is in particular advantageous if the groove in which the sealing element is inserted is curved in a similar way to the edges of the steps.

The term "close to the step" should be understood to mean that the spacing between that side wall of the groove which is arranged closest to the contact surface of the step and the contact surface of the step is smaller than 2 cm. There is advantageously no spacing such that the contact surface of the step and said side wall of the groove merge into each other with no offset.

The spiral strip is wound like a helix with a constant radius along its axial direction. As a result, it is designed to be radially elastic and is in particular manufactured from metal. It can therefore be elastically deformed with respect to its radial extent so that it can press the sealing strip against the side walls, seated radially compressed in the groove. This ensures that the sealing strip is seated securely and in sealing fashion over the entire longitudinal extent of the groove.

In addition, the sealing arrangement according to the invention is very simple to fit because the sealing element first needs to be inserted into the curved groove, after which one component then needs to be brought to bear against the other component as a result of said transverse movement. It is here particularly advantageous that the assembly movement is not dependent on the presence of the sealing element: it is of no importance for the method of assembling the two components whether the sealing element is or is not present.

Advantageous embodiments are given in the dependent claims.

The sealing arrangement is in particular a turbine housing comprising a first upper housing part and a second upper housing part as well as a lower housing part, wherein the first upper housing part is designed as one of the two components of a sealing arrangement according to the abovedescribed type, and the second upper housing part is designed as the other of the two components of the sealing arrangement.

In thermal turbomachines or turbine housings, the terms "upper" and "lower" refer to the horizontal plane. However, this should not be understood to be limiting because the sealing arrangement according to the invention can also be used in turbomachines of this type which are, for example, installed vertically and thus can instead have a left-hand housing part and a right-hand housing part instead of the lower housing part and the upper housing part. The same applies for the terms "first" and "second" and "one of the two" and "the other of the two".

According to a further advantageous embodiment, the curvature of the edges of the steps is in the shape of an arc of a circle about a notional center point, and the center point lies on a notional center axis extending in an axial direction and about which the two components are arched in a similar fashion to the curvature of the edges. The two components can therefore be designed in the form of a tubular shell, wherein the tubular shell has a length which extends in the circumferential direction, and in particular have a length of 180°. The components are then designed in the form of half-pipes in order to be able to form, together with another pair, for example a turbine housing. In the case of a small arc length, the number of split joints increases.

Moreover, the concavely curved side wall of the groove is offset relative to the concavely curved side wall of the recess in such a way that the gap surface of the concavely curved side wall covers an opening of the groove only partially and hence slightly. This embodiment enables the sealing element seated in the groove to be shifted slightly over the groove opening during the transverse movement of the side wall of the recess, so that as a result springy contact of the sealing portion of the sealing element against the relevant side face of the recess is produced, which increases the sealing effect. The term "slightly" should be understood here to mean that, for example, an offset of just approximately 0.3 mm to approximately 1 mm is sufficient in the case of a groove opening with a width of approximately 1 cm.

The terms "convex/convexly" and "concave/concavely" refer to the surfaces which face outward and inward owing to said curvature.

On their outward facing side, the two components advantageously have flanges for mutual fastening by means of flange screw connections. A relatively simple fastening of the two components to each other can hereby be effected.

Overall, the invention thus relates to a sealing arrangement for sealing a gap between two components which at room temperature bear flat against each other on the gap side and which can also be fitted by means of a transverse movement, wherein each component has a step for forming an overlapping stop on the gap side and the steps are curved along their edges. In order to provide an improved sealing arrangement which ensures, on the one hand, simpler fitting by means of a transverse movement of the two relevant components relative to each other and, on the other hand, despite the possibility of the two gap surfaces of the components gaping apart, also particularly reliable sealing of the gap that exists between the two gap surfaces, it is provided that one of the two components has a first groove which extends in a similar fashion to the curved edge and is arranged in the gap surface, set back owing to the step, of the relevant component, that the other of the two components has a recess opposite the groove, and that a modular sealing element comprising a sealing strip and a metal spiral strip is provided which, seated in the groove, bears against a side face of the recess with a first sealing portion.

BRIEF DESCRIPTION OF THE DRAWINGS

Other advantages and features of the invention are given in detail with reference to further exemplary embodiments. In the drawings.

DETAILED DESCRIPTION OF INVENTION

Figure 1:
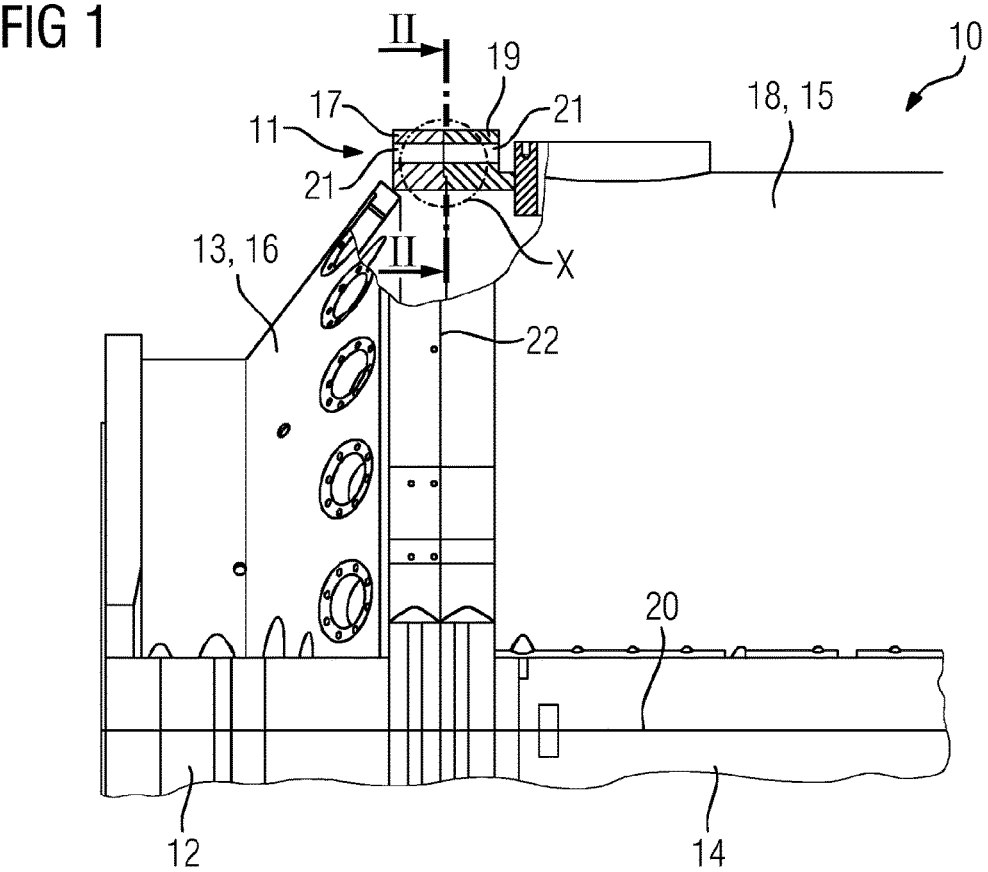
FIG. 1 shows a side view of a gas turbine housing with two housing parts which bear flat on each other on the gap side.

Identical features are provided with the same reference numerals in all the drawings.

FIG. 1 shows a side view of a portion of the housing 10 of a stationary gas turbine. In the exemplary embodiment shown, the housing 10 comprises a first lower housing part 12, a second lower housing part 14, a first upper housing part 16, and a second upper housing part 18. Each of the housing parts 12, 14, 16, 18 is designed in the form of a half-pipe so that a horizontal split joint 20 is formed between the two lower housing parts 12, 14 and the two upper housing parts 16, 18. At room temperature, the respective housing parts lie in the horizontal split joint 20, flat against each other with their gap surfaces. Above the horizontal split joint 20, the first upper housing part 16 and the second upper housing part 18 bear against each other in a vertical split joint 22 on the gap side. In the exemplary embodiment shown, the vertical split joint 22 extends downward beyond the horizontal split joint 20 so that the first lower housing part 12 and the second lower housing part 14 bear flat against each other on the gap side. According to this application, those surfaces of the housing parts 12, 14, 16, 18 which face the respective opposite components are arranged on the relevant component on the gap side.

The housing parts 16, 18 have flanges 17, 19 which are arranged in the region of the vertical split joint and in which bores 21 are arranged. Expansion screws (not shown) which press the two housing parts 16, 18 firmly against each other on the gap side sit in these bores 21.

The invention is explained in detail below with the aid of the two upper housing parts 16, 18, wherein the first upper housing part 16 represents one (13) of the two components 13, 15 of a sealing arrangement 11 according to the invention and the second upper housing part 18 the other (15) of the two components 13, 15 of a sealing arrangement according to the invention.

Because the two upper housing parts 16, 18 in part have identical features, the reference numerals for these features have been given the suffixes "a" and "b" in the following description of the drawings. The suffix "a" is appended to the relevant reference numerals to identify the features of the first upper housing part 16, and the suffix "b" is appended to identify the features of the second upper housing part 18. When the relevant reference numerals are used without any suffix, the features of both housing parts 16, 18 are understood to be covered.

Figure 2:
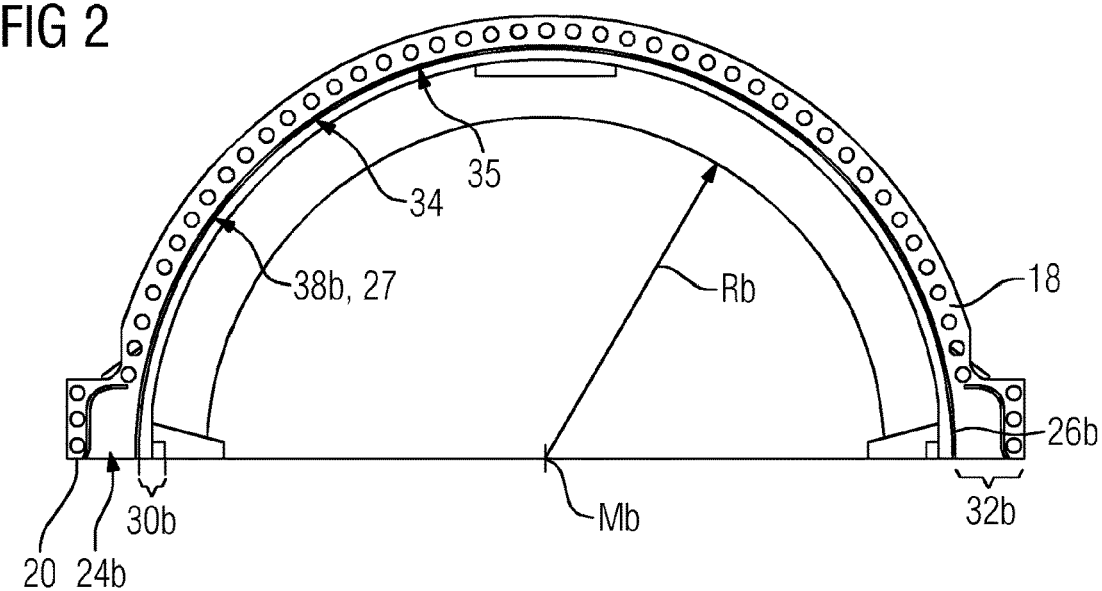
FIG. 2 shows a side view in cross-section through the housing from FIG. 1 of a first component of a sealing arrangement according to the invention.

FIG. 2 shows the section along the line of section II-II from FIG. 1, wherein the line of section coincides with the vertical split joint 22 so that FIG. 2 at the same time represents a side view of the second upper housing part 18. The second upper housing part 18 extends about a notional center point Mb with a constant radius Rb over an arc length of 180°. A step 26b is arranged in a gap side 24b, facing the observer in FIG. 2, of the second upper housing part 18. The step 26b is of a form such that that part 30b of the gap surface which is situated radially further inward than the step 26b is set back relative to that part 32b of the gap surface which is situated radially on the outside. A contact surface 38b of the step 26b thus faces the center point Mb.

At the same time, the step 26b is shortened by a recess 34 so that a second step 35 is formed.

The step 26b therefore has an edge 27b which is curved along its extent, in the same way as the housing part 18 itself. The edge 27b per se can also be rounded.

Figure 3:
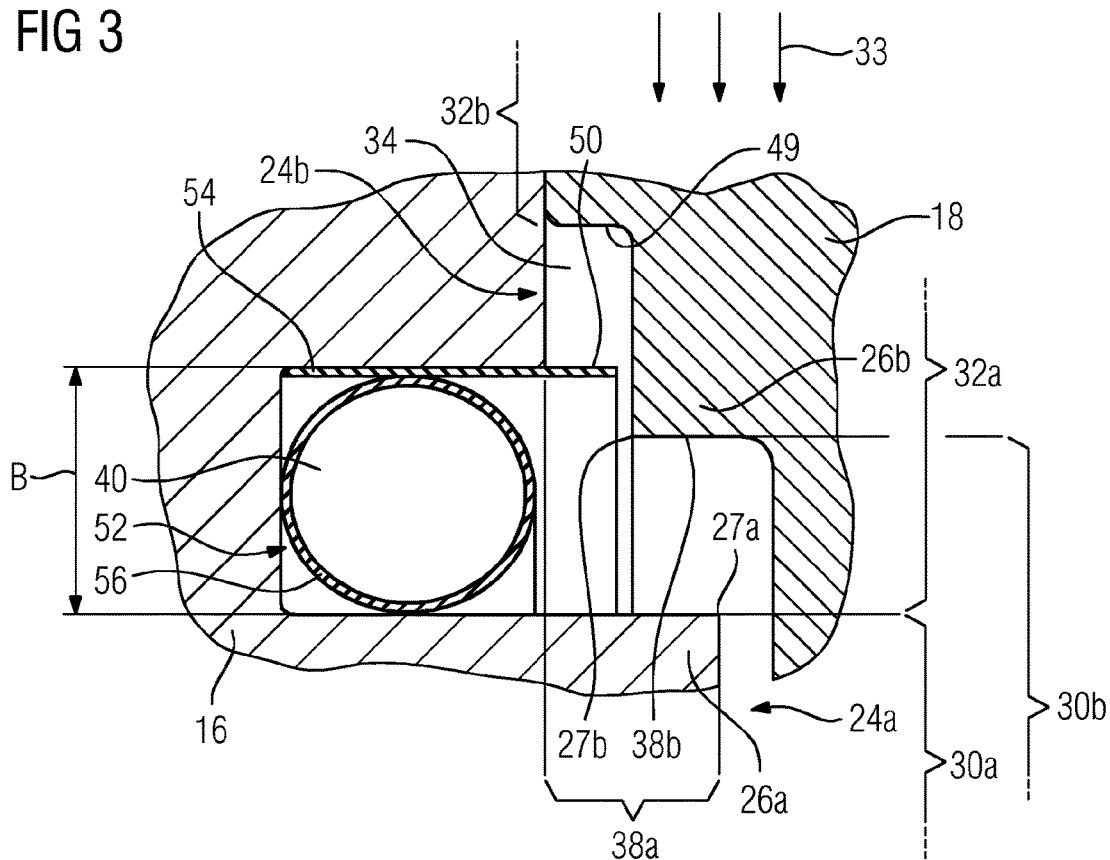
FIG. 3 shows the detail X from FIG. 1 with the first housing part and the second housing part shortly before the completion of the positioning of the second housing part relative to the first housing part and with a sealing element.

FIG. 3 shows a cross-section through the detail X from FIG. 1. The first upper housing part 16 is shown on the left in FIG. 3 in its final operating position, whereas the second upper housing part 18 is shown still in a fitted position, shortly before it reaches its final operating position. The arrows 33 represent the direction of movement of the second upper housing part 18 relative to the first upper housing part 16, which is transverse to the plane of the gap surface. The second upper housing part 18 comprises said gap side 24b and the step 26b, wherein, owing to the step 26b and the recess 34, the gap side 24b is divided into the part surface 30b situated radially further inward and the part surface 32b situated radially further outward.

The first upper housing part 16 likewise comprises a gap side 24a and a step 26a which divides the gap side 24a into a radially outer part surface 32a and a radially inner part surface 32a. However, in the case of the first upper housing part 16, the radially outer part surface 32a is set back relative to the radially inner part surface 30a.

Figure 5:
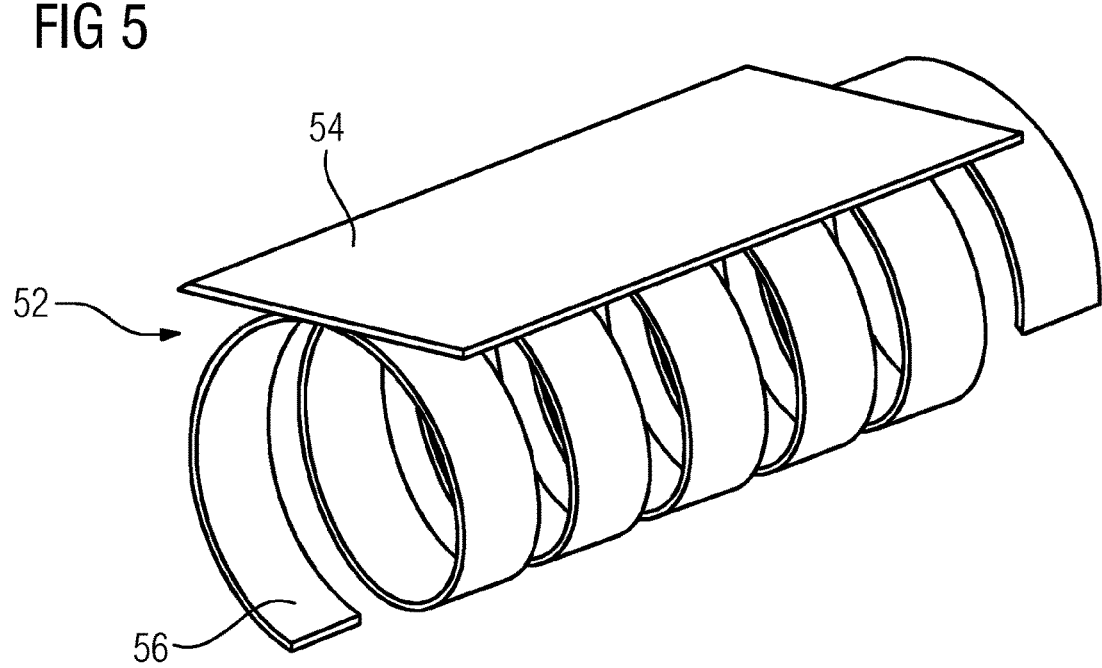
FIG. 5 shows the sealing element in a perspective view.

Each step 26 has a contact surface 38. Moreover, a groove 40 which is curved in the form of an arc of a circle in the same way as the edge 27a of the step 26 is provided in the side surface 24a of the first upper housing part 16. The groove 40 is in particular located close to the step: in the exemplary embodiment according to FIG. 3, the convex side wall of the groove 40 is on the same radius as the convex contact surface 38a of the step 26a. A modular sealing element 52 sits in the groove 40. The modular sealing element essentially comprises a sealing strip 54 and a spiral strip 56, as is clear in perspective in FIG. 5.

The spiral strip 56 is in principle not literally spiral and instead wound helically. However, the term "spiral strip" has become established for such strips. The spiral strip 56 which sits in the groove 40 is metal, has a spring action which is radial with respect to its extension, and bears against one side wall of the groove 40 in order to press the sealing strip 54 elastically against the other side wall of the groove 40. The diameter of the helical sealing strip 54 here corresponds essentially to the groove width B of the groove 40, or is slightly greater. The sealing strip 54 projects from the groove 40 with a first sealing portion 50.

Figure 4:
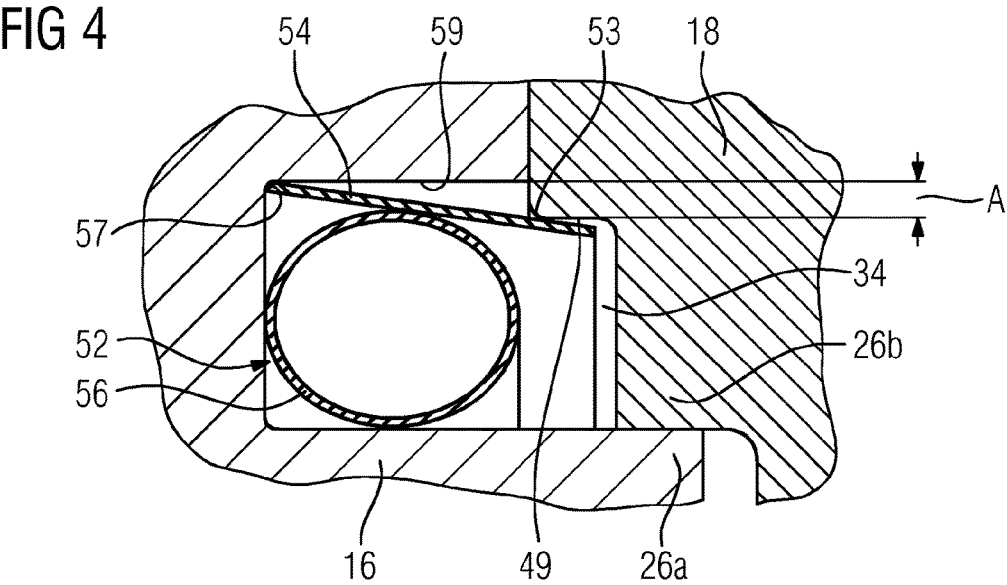
FIG. 4 shows the detail X from FIG. 1 with the final positioning of the two components relative to each other and with a sealing element.

FIG. 4 shows the first upper housing part 16 and the second upper housing part 18 in their final operating position. The steps 26 here bear flat against each other as a stop, in the same way as the radially outer part surfaces 30. The recess 34 is dimensioned such that a small offset A exists between the concave side wall of the groove 40 and the concave side wall 49 of the recess 34. This results in the sealing strip 42 bearing with its first sealing portion 50 against the side wall 49 or its edge 53 under pretension in the installed state. The spiral strip 56 moreover presses the other longitudinal edge 57 of the sealing strip 54 against the concavely curved side wall 59 of the groove 40 so that it seals the gap. Where, owing to thermal expansion, those part surfaces 30 of the upper housing parts 16, 18 which are situated radially outside the step 26 would gape apart and hence open up a flow path for a leak, the sealing line of the edge 53 is displaced along the first sealing section 50, as a result of which a leaktight arrangement of the two components is moreover provided.

The sealing element 52 has the advantage that it can be produced and fitted considerably more easily, in particular taking into account the fact that the groove 40 in which the sealing element 52 is inserted is in the form of an arc of a circle and accordingly the sealing elements 52 must also, despite their relatively simple geometrical cross-sectional contour, be curved along the longitudinal extent.

For reasons of symmetry, it is appropriate that the sealing arrangement 11 according to the invention is used not only in the upper half of the housing 10 of the gas turbine but also for the lower housing parts 12, 14. Nonetheless, it is, however, also possible for the lower housing parts 12, 14 not to be designed modularly but as a single piece.

Although the invention has been illustrated and described in detail using preferred exemplary embodiments, the invention is not limited by the disclosed examples and other variants can be derived by a person skilled in the art without going beyond the scope of the invention. In particular, the features of different exemplary embodiments can be combined with one another.

The invention claimed is:

1. A sealing arrangement for sealing a gap between a first component and a second component,
    wherein each component comprises, on the gap side, a step for forming an overlapping stop and the steps are curved along their edges, wherein the first component has a groove extending in a similar fashion to the curved edge and which is arranged in a set-back part surface of the first component, wherein the second component has a recess opposite the groove,
    wherein a sealing strip is seated lengthwise in the groove, and is pressed against the side wall of the groove by a radial spring action and bears, with a sealing portion projecting from the groove, against a side face of the recess,
    wherein the two components at room temperature bear flat against each other on the gap side, and
    wherein a spiral strip is wound helically along its longitudinal extent and thus, seated lengthwise in the groove, causes the radial spring action.

2. The sealing arrangement as claimed in claim 1,
    wherein the curvature of the edges is in the shape of an arc of a circle about a notional center point, and wherein the center point lies on a notional center axis extending in an axial direction and about which the two components are arched in a similar fashion to the curvature of the edges.

3. The sealing arrangement as claimed in claim 2,
    wherein the two components extend in a circumferential direction of the arc of a circle over a length of 180°.

4. The sealing arrangement as claimed in claim 1,
    wherein the concavely curved side wall of the groove is offset relative to a concavely curved side wall of the recess, wherein a gap surface of the second component covers the groove partially.

5. The sealing arrangement as claimed in claim 1,
    wherein the two components have flanges for mutual fastening by flange screw connections.

6. A turbine housing comprising:
    a first upper housing part, a second upper housing part, a lower housing part, and
    a sealing arrangement as claimed in claim 1,
    wherein the first component forms the first upper housing part and the second component forms the second upper housing part.

* * * * *